(12) United States Patent
Liu et al.

(10) Patent No.: US 12,712,338 B2
(45) Date of Patent: Aug. 18, 2026

(54) INVERTER APPARATUS AND INVERTER SYSTEM

(71) Applicant: Huawei Digital Power Technologies Co., Ltd., Shenzhen (CN)

(72) Inventors: Lin Liu, Shanghai (CN); Yanzhong Zhang, Shanghai (CN); Zhangrui Chen, Shanghai (CN); Zhenhuan Shu, Suzhou (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 269 days.

(21) Appl. No.: 18/231,925

(22) Filed: Aug. 9, 2023

(65) Prior Publication Data

US 2023/0387823 A1 Nov. 30, 2023

Related U.S. Application Data

(63) Continuation of application No. PCT/CN2021/076567, filed on Feb. 10, 2021.

(51) Int. Cl.
*H02B 1/04* (2006.01)
*H02B 13/00* (2006.01)
*H02M 7/00* (2006.01)

(52) U.S. Cl.
CPC ............... *H02B 1/04* (2013.01); *H02B 13/00* (2013.01); *H02M 7/003* (2013.01)

(58) Field of Classification Search
None
See application file for complete search history.

(56) References Cited

U.S. PATENT DOCUMENTS 9,627,894 B1 * 4/2017 Mayer ..................... H02J 3/381
10,284,115 B2 * 5/2019 Kulka ....................... H02J 7/35
2008/0238195 A1 * 10/2008 Shaver .................. H10F 77/955 307/18

(Continued)

FOREIGN PATENT DOCUMENTS

CN 104967035 A 10/2015
CN 205681320 U 11/2016

(Continued)

OTHER PUBLICATIONS

Diorio Nicholas A. et al: "DC-connected Solar Plus Storage Modeling and Analysis for Behind-The-Meter Systems in the System Advisor Model", 2018 IEEE 7th World Conference on Photovoltaic Energy Conversion (WCPEC) (A Joint Conference of 45th IEEE PVSC, 28th PVSEC and 34th EU PVSEC), Jun. 1, 2018, total 6 pages.

*Primary Examiner* — Courtney L Smith
(74) *Attorney, Agent, or Firm* — WOMBLE BOND DICKINSON (US) LLP

(57) ABSTRACT

Embodiments of this application provide an inverter apparatus and an inverter system. In the inverter apparatus, a direct current output end of an alternating and direct current distribution cabinet is connected to a first direct current input end of an inverter. A first alternating current output end of the inverter is connected to an alternating current input end of the alternating and direct current distribution cabinet, and the alternating and direct current distribution cabinet outputs a converged alternating current. In this way, on-site wiring is simplified, and on-site maintenance is reduced to some extent.

20 Claims, 6 Drawing Sheets

(56) References Cited

U.S. PATENT DOCUMENTS

| | | | | |
|---|---|---|---|---|
| 2018/0034385 | A1* | 2/2018 | Huang | H02M 7/797 |
| 2018/0131193 | A1* | 5/2018 | Zhao | H02J 13/00017 |
| 2023/0163597 | A1* | 5/2023 | Zhou | H02J 1/102<br>307/82 |
| 2023/0387823 | A1* | 11/2023 | Liu | H02J 3/32 |

FOREIGN PATENT DOCUMENTS

| | | | |
|---|---|---|---|
| CN | 207218629 | U | 4/2018 |
| CN | 207321199 | U | 5/2018 |
| CN | 110912196 | A | 3/2020 |
| CN | 210380669 | U | 4/2020 |
| CN | 111434000 | A | 7/2020 |
| KR | 20180122071 | A | 11/2018 |

* cited by examiner

1

Inverters

30

100

20

Photovoltaic device

Alternating and direct current distribution cabinet

Energy storage device

200

300

Transformer

400

INVERTER APPARATUS AND INVERTER SYSTEM

CROSS-REFERENCE TO RELATED APPLICATIONS

This application is a continuation of International Application No. PCT/CN2021/076567, filed on Feb. 10, 2021. The disclosure of which is hereby incorporated by reference in its entirety.

TECHNICAL FIELD

Embodiments of this application relate to the technical field of photovoltaic inverters, and in particular, to an inverter apparatus and an inverter system.

BACKGROUND

With the continuous development of science and technology, photovoltaic power generation has been widely applied increasingly. An inverter is an extremely important device in a process of photovoltaic power generation, and the inverter is an electronic device that converts a low-voltage direct current into a high-voltage alternating current. For example, a photovoltaic inverter is a power regulating apparatus including a semiconductor component, is mainly configured to convert direct current power into alternating current power, and generally includes a boost circuit and a bridge type inverter circuit. The boost circuit boosts a direct voltage of a solar cell to a direct voltage for output control of the inverter, and the bridge type inverter circuit equivalently converts the boosted direct voltage into an alternating voltage at a common frequency.

According to an inverter solution of a photovoltaic inverter system in a conventional technology, a corresponding direct current is mainly received at each of direct current input ends of a plurality of inverters, at least one distribution box converges alternating currents output by the plurality of inverters, an upper computer communicates with the plurality of inverters by using a communication apparatus, and finally, grid-connection is implemented by using a box-type transformer. The plurality of inverters, the at least one distribution box, and the communication apparatus are all disposed on one framework platform.

However, when the solution is applied, there are a relatively large quantity of alternating current lines and direct current lines corresponding to the plurality of inverters, and the on-site wiring is complex, increasing on-site maintenance to some extent.

SUMMARY

Embodiments of this application provide an inverter apparatus and an inverter system, to simplify on-site wiring and reduce on-site maintenance to some extent.

A first aspect of embodiments of this application provides an inverter apparatus, including at least one frame, and a plurality of inverters and an alternating and direct current distribution cabinet that are in each frame. The alternating and direct current distribution cabinet has a direct current output end and an alternating current input end, and the inverters each have a first direct current input end and a first alternating current output end; and the direct current output end of the alternating and direct current distribution cabinet is connected to first direct current input ends of the inverters, first alternating current output ends of the inverters are connected to the alternating current input end of the alternating and direct current distribution cabinet, and the alternating and direct current distribution cabinet outputs a converged alternating current.

According to the inverter apparatus provided in this embodiment of this application, the inverter apparatus includes the at least one frame, and the plurality of inverters and the alternating and direct current distribution cabinet that are in each frame. The alternating and direct current distribution cabinet has the direct current output end and the alternating current input end, and the inverters each have the first direct current input end and the first alternating current output end. The direct current output end of the alternating and direct current distribution cabinet is connected to the first direct current input ends of the inverters, the first alternating current output ends of the inverters are connected to the alternating current input end of the alternating and direct current distribution cabinet, and the alternating and direct current distribution cabinet outputs the converged alternating current. A direct current through the alternating and direct current distribution cabinet passes through the direct current output end and the first direct current input ends and is then transferred to the inverters. The inverters convert the direct current into an alternating current. The alternating current goes back to the alternating and direct current distribution cabinet through the first alternating current output ends and the alternating current input end. The alternating and direct current distribution cabinet then converges and outputs the alternating current. In this way, compared with a manner of disposing a direct current distribution cabinet and an alternating current distribution cabinet separately in a conventional technology, this embodiment of this application can simplify on-site wiring by using a coupled alternating and direct current distribution cabinet, so that on-site maintenance is reduced to some extent.

In an embodiment, the alternating and direct current distribution cabinet further has a second direct current input end. The second direct current input end of the alternating and direct current distribution cabinet is connected to a photovoltaic device, and the second direct current input end is configured to receive a direct current from the photovoltaic device.

The second direct current input end of the alternating and direct current distribution cabinet is connected to the photovoltaic device, so that it is ensured that the photovoltaic device inputs a direct current into the alternating and direct current distribution cabinet, thereby ensuring that the direct current is transferred to the inverters via the alternating and direct current distribution cabinet and then converted into an alternating current.

In an embodiment, the direct current output end of the alternating and direct current distribution cabinet includes first direct current output ends and a second direct current output end. The first direct current output ends are connected to the first direct current input ends of the inverters, the second direct current output end is connected to an energy storage device, and the energy storage device is configured to store a part of the direct current from the photovoltaic device.

The first direct current output ends of the alternating and direct current distribution cabinet are connected to the first direct current input ends of the inverters, and the second direct current output end of the alternating and direct current distribution cabinet is connected to the energy storage device, so that it is ensured that the part of the direct current of the photovoltaic device is transferred to the energy storage device via the alternating and direct current distribution cabinet for storage for later use.

In an embodiment, the alternating and direct current distribution cabinet further has a second alternating current output end. The second alternating current output end of the alternating and direct current distribution cabinet is connected to a transformer; and the alternating current is output to the transformer through the second alternating current output end, and the transformer is configured to connect the alternating current to a grid.

The second alternating current output end of the alternating and direct current distribution cabinet is connected to the transformer, so that it is ensured that after a direct current entering the alternating and direct current distribution cabinet is converted into the alternating current, the alternating current is output to the transformer through the second alternating current output end, and the transformer connects the alternating current to the grid for power generation.

In an embodiment, when an output power of the photovoltaic device is greater than an output power of the inverters, a superfluous direct current in the photovoltaic device is transferred, via the alternating and direct current distribution cabinet, to the energy storage device for charging; or when an output power of the photovoltaic device is less than an output power of the inverters, the direct current in the energy storage device is transferred to the inverters via the alternating and direct current distribution cabinet, and the inverters convert the direct current into an alternating current.

In this way, the direct current in the photovoltaic device can be properly planned and effectively used to a maximum extent, thereby avoiding an energy loss.

In an embodiment, the inverters are placed in the frame side by side along a first direction. The inverters are placed in the frame side by side along the first direction. Compared with placing the inverters in the frame end to end or in another manner, the layout design of the inverters in the frame can achieve maximum utilization, thereby maximizing a capacity of the frame.

In an embodiment, the plurality of inverters are arranged into an array of at least two rows, and there is a passage between two adjacent rows of inverters. The first direct current input end and the first alternating current output end are separately on two sides of each of the inverters. One of the first direct current input end and the first alternating current output end faces towards the passage, and the other of the first direct current input end and the first alternating current output end faces away from the passage.

In an embodiment, there is a preset distance between two adjacent inverters in a plurality of inverters in a same row; and the preset distance is less than one tenth of a thickness of the inverter.

There is the preset distance between two adjacent inverters in the plurality of inverters in the same row, so that a problem of poor heat dissipation of the inverters when the two adjacent inverters are close to each other can be avoided. In addition, the preset distance is set to less than one tenth of the thickness of the inverter, so that not only heat dissipation performance of the inverters is ensured, but space utilization of the inverters in the frame can also satisfy a requirement.

In an embodiment, the plurality of inverters include a first inverter group and a second inverter group. The passage is between the first inverter group and the second inverter group. The first direct current input ends face away from the passage, and the first alternating current output ends face towards the passage.

In an embodiment, the second alternating current output end is filled with a copper bar, and the copper bar is covered by a sealing plate. The inverter apparatus further includes a connection piece. When the second alternating current output end is connected to the transformer, one end of the connection piece is connected to the copper bar inside the second alternating current output end, and the other end of the connection piece is connected to the transformer.

In this way, when the transformer needs to be connected to the alternating and direct current distribution cabinet, the sealing plate that covers the copper bar is removed, so that the copper bar is exposed outside of the second alternating current output end, and the transformer can be electrically connected to the alternating and direct current distribution cabinet by using the connection piece. When the transformer does not need to be connected to the alternating and direct current distribution cabinet, the sealing plate covers the copper bar, to achieve a better look of the second alternating current output end of the alternating and direct current distribution cabinet.

In an embodiment, the connection piece is a soft copper bar or a bellow.

In an embodiment, a quantity of the alternating and direct current distribution cabinet is one. The second direct current input end of the alternating and direct current distribution cabinet is connected to the photovoltaic device, and the second direct current input end is configured to receive the corresponding direct current; and the alternating and direct current distribution cabinet has the plurality of first direct current output ends, and the plurality of first direct current output ends are connected to the first direct current input ends of the plurality of inverters in a one-to-one correspondence.

In an embodiment, a quantity of the alternating and direct current distribution cabinet is more than one. There is an alternating current interconnection between the plurality of alternating and direct current distribution cabinets. The second direct current input end of each of the plurality of alternating and direct current distribution cabinets is connected to the photovoltaic device, and the second direct current input end is configured to receive the corresponding direct current. The first direct current output ends of the plurality of alternating and direct current distribution cabinets are connected to the first direct current input ends of the plurality of inverters in a one-to-one correspondence.

In an embodiment, switches or fuses are provided between the first direct current output ends of the alternating and direct current distribution cabinet and the first direct current input ends of the inverters. The switches or the fuses are provided between the first direct current output ends of the alternating and direct current distribution cabinet and the first direct current input ends of the inverters, to facilitate control of enabling or disabling direct current transfer between the alternating and direct current distribution cabinet and the inverters. Switch control can simplify an on-site construction and maintenance scenario. In addition, the fuses can protect the inverters and prevent faults such as a short circuit in the inverters.

In an embodiment, switches or fuses are provided between the alternating current input end of the alternating and direct current distribution cabinet and the first alternating current output ends of the inverters. The switches or the fuses are provided between the alternating current input end of the alternating and direct current distribution cabinet and the first alternating current output ends of the inverters, to facilitate control of enabling or disabling alternating current transfer between the alternating and direct current distribution cabinet and the inverters. Switch control can simplify an on-site construction and maintenance scenario. In addition, the fuses can protect the inverters and prevent faults such as a short circuit in the inverters.

In an embodiment, each of the switches is connected to the first alternating current output end of each of the inverters in a one-to-one correspondence, or each of the switches is correspondingly connected to first alternating current output ends of at least two of the inverters.

In an embodiment, a switch or a fuse is provided between the second direct current input end of the alternating and direct current distribution cabinet and the photovoltaic device. The switch or the fuse is provided between the second direct current input end of the alternating and direct current distribution cabinet and the photovoltaic device, to facilitate control of enabling or disabling direct current transfer between the alternating and direct current distribution cabinet and the inverters. Switch control can simplify an on-site construction and maintenance scenario. In addition, the fuse can protect a circuit and prevent faults such as a short circuit.

In an embodiment, a switch or a fuse is provided between the second alternating current output end of the alternating and direct current distribution cabinet and the transformer. The switch or the fuse is provided between the second alternating current output end of the alternating and direct current distribution cabinet and the transformer, to facilitate control of enabling or disabling alternating current transfer between the alternating and direct current distribution cabinet and the inverters. Switch control can simplify an on-site construction and maintenance scenario. In addition, the fuse can protect a circuit and prevent faults such as a short circuit.

In an embodiment, a switch or a fuse is provided between the second direct current output end of the alternating and direct current distribution cabinet and the energy storage device. The switch or the fuse is provided between the second direct current output end of the alternating and direct current distribution cabinet and the energy storage device, to facilitate control of enabling or disabling direct current transfer between the alternating and direct current distribution cabinet and the inverters. Switch control can simplify an on-site construction and maintenance scenario. In addition, the fuse can protect a circuit and prevent faults such as a short circuit.

In an embodiment, the switch is any one of a circuit breaker, a strip-type fuse switch, a load switch, or a contactor.

In an embodiment, the frame at least includes a platform. The alternating and direct current distribution cabinet is on the platform, and the inverters are disposed above the alternating and direct current distribution cabinet.

In an embodiment, the frame further includes a lateral framework. The lateral framework is fixedly connected to the platform; and the lateral framework surrounds and keeps at least a part of the alternating and direct current distribution cabinet and a part of the inverters on an inner side of the frame. In this way, the lateral framework can protect four sides of the alternating and direct current distribution cabinet and the inverters and prevent the periphery of the alternating and direct current distribution cabinet and the inverters from being worn down or damaged.

In an embodiment, the frame further includes a top framework. One end of the lateral framework is fixedly connected to the top framework, and the other end of the lateral framework is fixedly connected to the platform. The top framework is arranged opposite to the platform, and the top framework is disposed above the inverters to cover the inverters.

By disposing the top framework, the top framework can cover the alternating and direct current distribution cabinet and the inverters on the platform, for example, can keep out sunlight and rain, thereby preventing corrosion or aging caused by long-time exposure of the exterior of the devices on the platform.

In an embodiment, a projection area of the top framework in a vertical direction is greater than a projection area of the platform in the vertical direction. In this way, the top framework can better cover the devices on the platform, avoiding or reducing a problem of incomplete coverage.

In an embodiment, the inverter apparatus further includes an inverter support. The inverter support is configured to hold the inverters; and the inverter support is fixedly connected to the frame, or the inverter support is fixed to the alternating and direct current distribution cabinet.

By disposing the inverter support, the inverter support is fixed to the frame or the alternating and direct current distribution cabinet, so that the inverters can be placed more stably, and fixed positions of the inverters can be limited.

In an embodiment, a plurality of guide rails are further provided above the alternating and direct current distribution cabinet, and the inverter support is in a sliding connection to the guide rails. In this way, the inverters can be mounted and removed in a pulling manner more conveniently.

In an embodiment, sliders are disposed on the inverter support, and the inverter support is connected to the guide rails by using the sliders.

In an embodiment, limiting pieces are further disposed on one side of the inverter support, and when the sliders slide relative to the guide rails, the limiting pieces are used to limit a movement range of the sliders.

In an embodiment, the guide rails are in parallel with a second direction; and the second direction is perpendicular to the first direction. The guide rails are in parallel with the second direction that is perpendicular to the first direction, so that the inverters can implement sideways pulling, for example, book pulling. This helps maximize utilization of space in the frame.

In an embodiment, a shock absorption structure is disposed on the inverter support. The shock absorption structure is between the inverters and the alternating and direct current distribution cabinet; or the shock absorption structure is between the inverters and the inverter support.

By disposing the shock absorption structure, a risk of vibration when the inverters are mounted and transported can be removed or reduced, thereby improving a service life of the inverters to some extent.

In an embodiment, the shock absorption structure is a rubber pad.

In an embodiment, the inverter apparatus further includes direct current cables and alternating current cables. One end of each of the direct current cables is connected to the first direct current input end of each of the inverters, and the other end of the direct current cable is connected to each of the first direct current output ends of the alternating and direct current distribution cabinet. One end of each of the alternating current cables is connected to the alternating current input end of the inverter, and the other end of the alternating current cable is connected to the alternating current output end of the alternating and direct current distribution cabinet.

In an embodiment, the inverter apparatus further includes signal wires. One end of each of the signal wires is connected to the inverter, and the other end of the signal wire is connected to a control unit. The control unit is configured to: control communication of the inverter, and detect a position of fault in the inverter. The signal wire is located above the inverter, to avoid the direct current cables and the alternating current cables. In this way, problems of a staggered serial connection and even crosstalk between the signal wires and the direct current cables and the alternating current cables can be avoided.

In an embodiment, an ingress protection rating of the inverters is greater than or equal to IP54. A higher ingress protection rating indicates better dustproof and moisture-proof performance. The ingress protection rating of the inverters is set to greater than or equal to IP54 to ensure dustproof and moisture-proof performance of the inverters.

In an embodiment, the inverters are unidirectional inverters or bidirectional inverters.

In an embodiment, the energy storage device includes at least one direct current converter, and the direct current converter is configured to regulate an energy storage voltage of the energy storage device.

A second aspect of embodiments of this application provides an inverter, including at least the inverter apparatus according to any one of the foregoing embodiments.

According to the inverter provided in this embodiment of this application, the inverter includes at least the inverter apparatus. The inverter apparatus includes the at least one frame, and the plurality of inverters and the alternating and direct current distribution cabinet that are in each frame. The alternating and direct current distribution cabinet has the direct current output end and the alternating current input end, and the inverters each have the first direct current input end and the first alternating current output end. The direct current output end of the alternating and direct current distribution cabinet is connected to the first direct current input ends of the inverters, the first alternating current output ends of the inverters are connected to the alternating current input end of the alternating and direct current distribution cabinet, and the alternating and direct current distribution cabinet outputs the converged alternating current. A direct current through the alternating and direct current distribution cabinet passes through the direct current output end and the first direct current input ends and is then transferred to the inverters. The inverters convert the direct current into an alternating current. The alternating current goes back to the alternating and direct current distribution cabinet through the first alternating current output ends and the alternating current input end. The alternating and direct current distribution cabinet then converges and outputs the alternating current.

In this way, compared with a manner of disposing a direct current distribution cabinet and an alternating current distribution cabinet separately in a conventional technology, this embodiment of this application can simplify on-site wiring by using a coupled alternating and direct current distribution cabinet, so that on-site maintenance is reduced to some extent.

In an embodiment, the inverter further includes a photovoltaic device. The alternating and direct current distribution cabinet in the inverter apparatus is connected to the photovoltaic device, and a second direct current input end of the alternating and direct current distribution cabinet is configured to receive a direct current from the photovoltaic device.

The second direct current input end of the alternating and direct current distribution cabinet is connected to the photovoltaic device, so that it is ensured that the photovoltaic device inputs a direct current into the alternating and direct current distribution cabinet, thereby ensuring that the direct current is transferred to the inverters via the alternating and direct current distribution cabinet and then converted into an alternating current.

In an embodiment, the inverter further includes an energy storage device. A second direct current output end of the alternating and direct current distribution cabinet is connected to the energy storage device, and the energy storage device is configured to store a part of the direct current from the photovoltaic device.

The first direct current output ends of the alternating and direct current distribution cabinet are connected to the first direct current input ends of the inverters, and the second direct current output end of the alternating and direct current distribution cabinet is connected to the energy storage device, so that it is ensured that the part of the direct current of the photovoltaic device is transferred to the energy storage device via the alternating and direct current distribution cabinet for storage for later use.

In an embodiment, the inverter further includes a transformer. A second alternating current output end of the alternating and direct current distribution cabinet is connected to the transformer, an alternating current is output to the transformer through the second alternating current output end, and the transformer is configured to connect the alternating current to a grid.

The second alternating current output end of the alternating and direct current distribution cabinet is connected to the transformer, so that it is ensured that after a direct current entering the alternating and direct current distribution cabinet is converted into the alternating current, the alternating current is output to the transformer through the second alternating current output end, and the transformer connects the alternating current to the grid for power generation.

These and other aspects, implementations, and advantages of example embodiments will become more obvious with reference to the accompanying drawings according to the embodiments described below. However, it should be understood that the description and the accompanying drawings are merely intended to describe and are not intended to limit embodiments of this application. For details, refer to the appended claims. Other aspects and advantages of embodiments of this application are described below, and some of the aspects and advantages are obvious in the descriptions, or are learned from practice of embodiments of this application. In addition, various aspects and advantages of embodiments of this application may be implemented and obtained by means and combinations specifically noted in the appended claims.

REFERENCE NUMERALS

Figure 1:
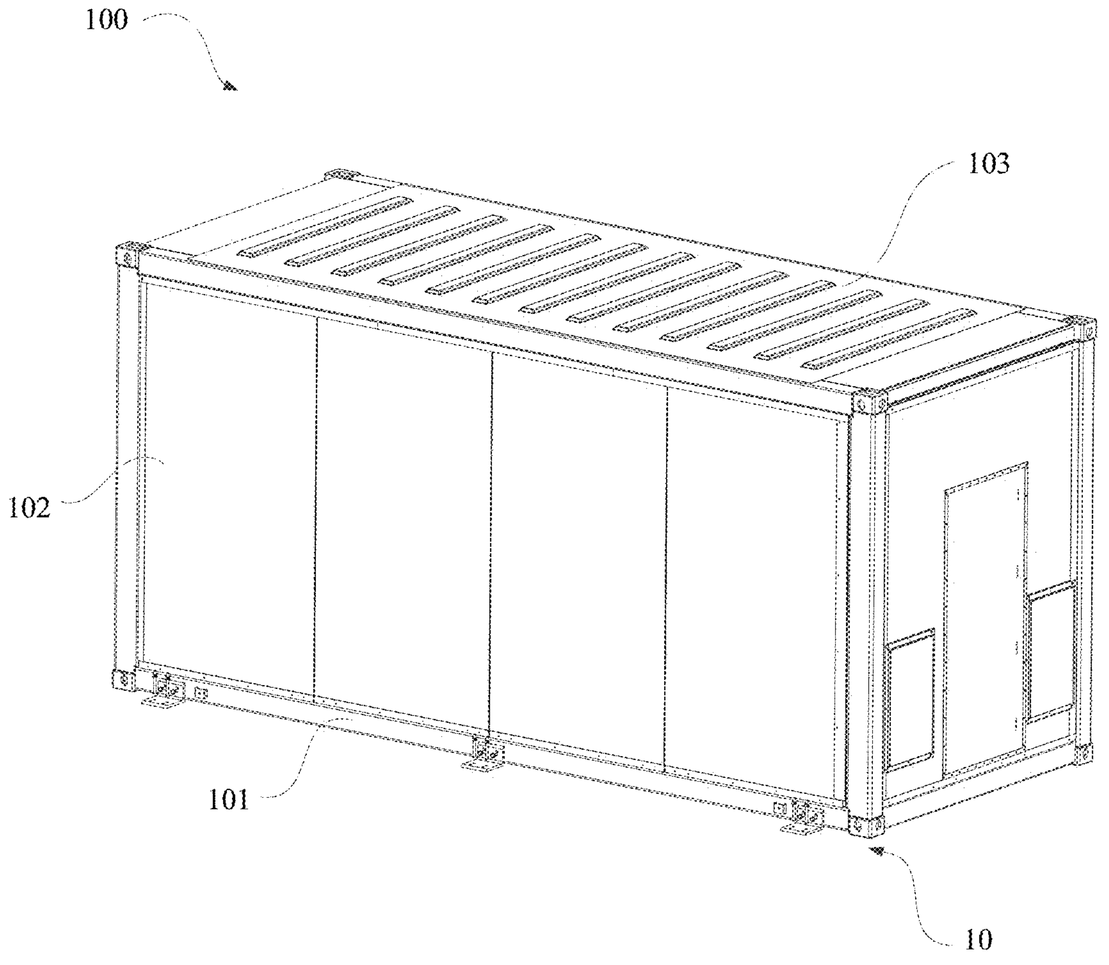
FIG. 1 is a schematic diagram of a structure of an inverter apparatus according to an embodiment of this application.

- 1: inverter system; 100: inverter apparatus; 10: frame;
- 101: platform; 102: lateral framework; 103: top framework;
- 20: alternating and direct current distribution cabinet; 201: alternating current switch; 202: direct current switch; 211: direct current output end; 212: alternating current output end 212;
- 203: energy storage switch; 204: second alternating current output end; 2041: copper bar;
- 2042: sealing plate; 30: inverter; 301: first direct current input end; 302: first alternating current input end;
- 31: passage; 32: first inverter group; 33: second inverter group;
- 40: inverter support; 50: guide rail; 60: shock absorption structure;
- 701: direct current cable; 702: alternating current cable; 80: signal wire;
- L1: first direction; L2: second direction; 200: photovoltaic device;
- 300: energy storage device; and 400: transformer.

DESCRIPTION OF EMBODIMENTS

Terms used in implementations of this application are merely intended to explain specific embodiments of this application, but are not intended to limit this application. The implementations of embodiments of this application are described below in detail with reference to the accompanying drawings.

At present, string inverters in a photovoltaic plant are usually scattered inside an array. The inverters are connected to a box-type transformer station by using an alternating current line. Alternatively, the inverters are collectively placed, converged, and then connected to the box-type transformer station.

For example, in a conventional technology, basically, direct current input ends of a plurality of inverters are connected to a plurality of battery panels, so that a corresponding direct current is received by each of the plurality of inverters, at least one distribution box converges alternating currents output from output ends of the plurality of inverters, an upper computer communicates with the plurality of inverters by using a communication apparatus, and finally, grid-connection is implemented by using a box-type transformer.

In this solution, the inverters are generally scattered and mounted near the battery panels. To converge outputs of the inverters to an alternating current distribution box, complex on-site mounting and fixing and cable routing and arrangement between the inverters and the alternating current distribution box, and a system layout are needed. In addition, subsequent on-site system operation and maintenance is relatively complex. As a result, when the solution is applied, there are a relatively large quantity of alternating current lines and direct current lines corresponding to the plurality of inverters and the distribution box, and the on-site wiring is complex with a difficulty in mounting and maintenance, increasing on-site maintenance to some extent.

In view of this, an embodiment of this application provides an inverter apparatus. A direct current output end of an alternating and direct current distribution cabinet is connected to first direct current input ends of inverters, first alternating current output ends of the inverters are connected to an alternating current input end of the alternating and direct current distribution cabinet, and the alternating and direct current distribution cabinet outputs a converged alternating current. A direct current through the alternating and direct current distribution cabinet passes through the direct current output end and the first direct current input ends and is then transferred to the inverters. The inverters convert the direct current into an alternating current. The alternating current goes back to the alternating and direct current distribution cabinet through the first alternating current output ends and the alternating current input end. The alternating and direct current distribution cabinet then converges and outputs the alternating current. In this way, on-site wiring is simplified, and on-site maintenance is reduced to some extent.

A specific structure of the inverter apparatus is described below with reference to the accompanying drawings.

Embodiment 1

Figure 2:
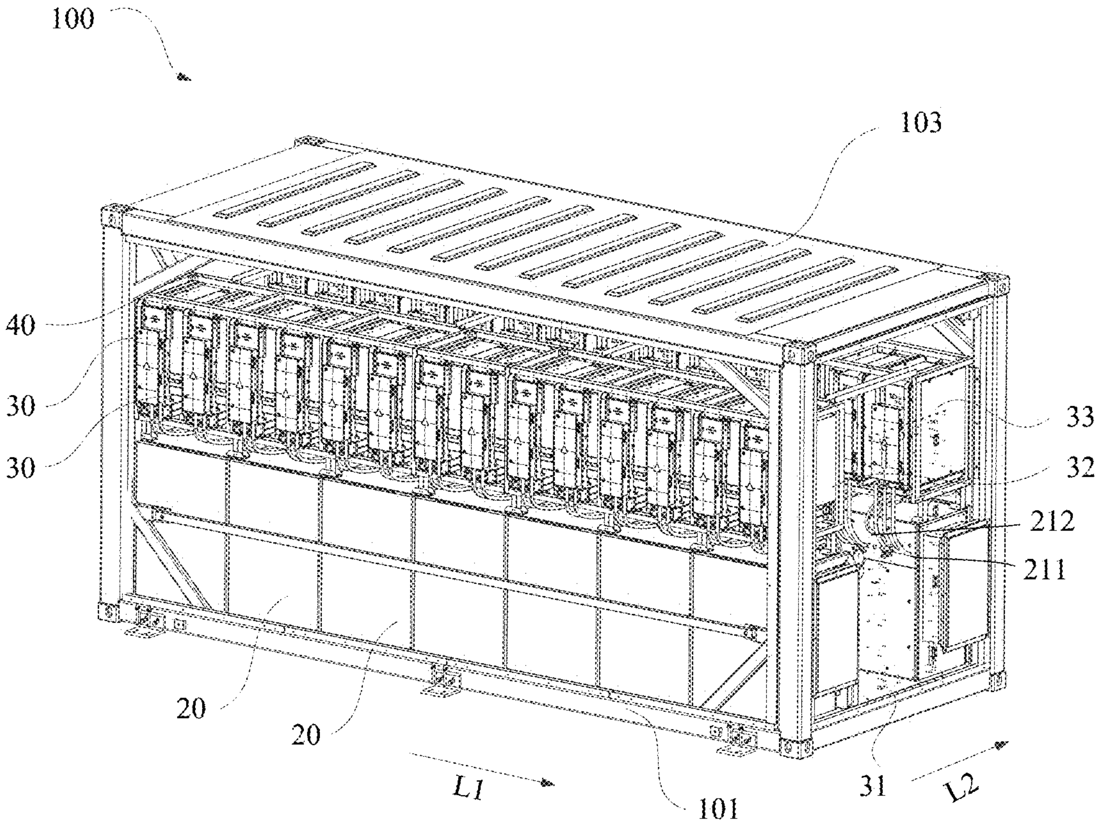
FIG. 2 is a schematic diagram of a structure of an inverter apparatus according to an embodiment of this application.
Figure 3:
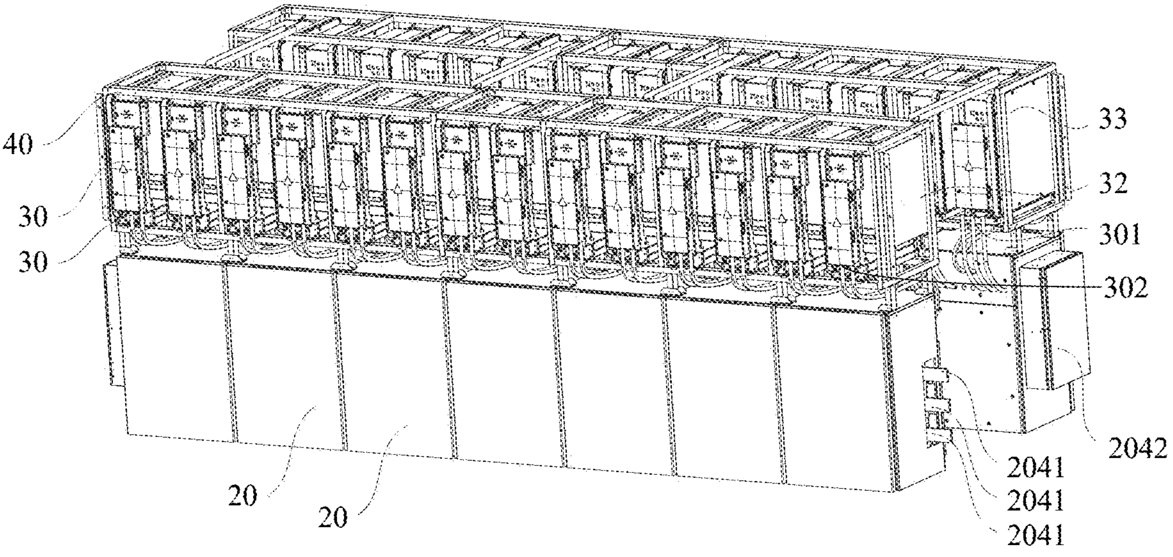
FIG. 3 is a schematic diagram of structures of an inverter and an alternating and direct current distribution cabinet in an inverter apparatus according to an embodiment of this application.

With reference to FIG. 1 and FIG. 2, an embodiment of this application provides an inverter apparatus 100. The inverter apparatus 100 may include at least one frame 10, a plurality of inverters 30 in each frame 10, and an alternating and direct current distribution cabinet 20 in each frame 10. The alternating and direct current distribution cabinet 20 may have a direct current output end 211 and an alternating current input end 212. The inverters 30 may each have a first direct current input end 301 (as shown in FIG. 3) and a first alternating current output end 302 opposite to the first direct current input end 301 (the first direct current input end 301 is on a front side of each of the inverters 30, and the first alternating current output end 302 is on a rear side of the inverter 30). The direct current output end 211 of the alternating and direct current distribution cabinet 20 is connected to first direct current input ends 301 of the inverters 30, first alternating current output ends 302 of the inverters 30 are connected to the alternating current input end 212 of the alternating and direct current distribution cabinet 20, and the alternating and direct current distribution cabinet 20 outputs a converged alternating current.

In this way, a direct current through the alternating and direct current distribution cabinet 20 passes through the direct current output end and the first direct current input ends 301 and is then transferred to the inverters 30. The inverters 30 convert the direct current into an alternating current. The alternating current goes back to the alternating and direct current distribution cabinet 20 through the first alternating current output ends and the alternating current input end. The alternating and direct current distribution cabinet 20 then converges and outputs the alternating current.

Compared with a manner of separately disposing a direct current distribution cabinet and an alternating current distribution cabinet in a conventional technology, this embodiment of this application can resolve a problem of complex on-site wiring of the plurality of inverters 30 by using the coupled alternating and direct current distribution cabinet 20, so that on-site system maintenance is reduced to some extent because of simplified on-site wiring, and near-end maintenance is more convenient and safer. For example, with simplified on-site construction wiring, ground-digging for wiring to connect the inverters 30 to the alternating and direct current distribution cabinet 20 can be avoided.

Figure 4:
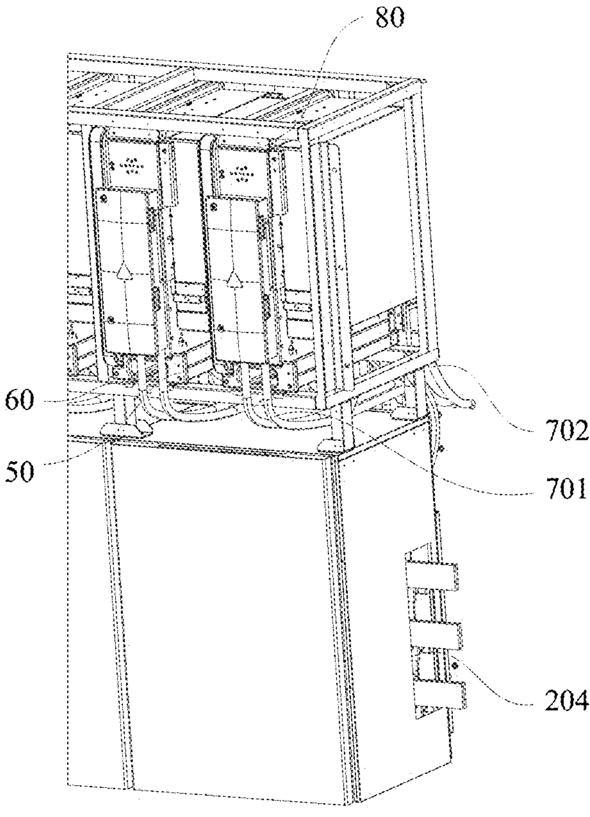
FIG. 4 is a schematic diagram of partial structures of an inverter and an alternating and direct current distribution cabinet in an inverter apparatus according to an embodiment of this application.

It is not difficult to understand that, in some embodiments, as shown in FIG. 4, the inverter apparatus 100 may further include direct current cables 701 and alternating current cables 702 (as shown in FIG. 4). One end of each of the direct current cables 701 is connected to the first direct current input end 301 of each of the inverters 30, and the other end of the direct current cable 701 is connected to each of the first direct current output ends of the alternating and direct current distribution cabinet 20. One end of each of the alternating current cables 702 is connected to the alternating current input end of the inverter 30, and the other end of the alternating current cable 702 is connected to the alternating current output end (a second alternating current output end 204) of the alternating and direct current distribution cabinet 20.

In an embodiment, a connection between the direct current output end of the alternating and direct current distribution cabinet 20 and the first direct current input ends 301 of the inverters and a connection between the first alternating current output ends of the inverters 30 and the alternating current input end of the alternating and direct current distribution cabinet 20 may be factory-preassembled. For example, in a scenario of pre-integrated delivery, the first direct current input ends 301 and the first alternating current output ends of the inverters 30 may be preassembled with the alternating and direct current distribution cabinet 20 before delivery.

In this embodiment of this application, the alternating and direct current distribution cabinet 20 may further have a second direct current input end. The second direct current input end of the alternating and direct current distribution cabinet 20 is connected to a photovoltaic device 200, and the second direct current input end is configured to receive a direct current from the photovoltaic device 200. The photovoltaic device 200 transfers the direct current to the alternating and direct current distribution cabinet 20 through the second direct current input end, so that the alternating and direct current distribution cabinet 20 transfers the direct current to the inverters 30 through the direct current output end and the first direct current input ends 301. In this way, it is ensured that the photovoltaic device 200 inputs a direct current into the alternating and direct current distribution cabinet 20, thereby ensuring that the direct current is transferred to the inverters via the alternating and direct current distribution cabinet 20 and then converted into an alternating current.

In some embodiments, the direct current output end of the alternating and direct current distribution cabinet 20 may include first direct current output ends and a second direct current output end. The first direct current output ends are connected to the first direct current input ends 301 of the inverters 30, the second direct current output end is connected to an energy storage device 300 that is configured to store a part of the direct current from the photovoltaic device 200.

The first direct current output ends of the alternating and direct current distribution cabinet 20 are connected to the first direct current input ends 301 of the inverters 30, and the second direct current output end of the alternating and direct current distribution cabinet 20 is connected to the energy storage device 300. After the direct current from the photovoltaic device 200 enters the alternating and direct current distribution cabinet 20, a part of the direct current enters the inverters 30 through the first direct current output ends and the first direct current input ends 301, and a superfluous part of the direct current enters the energy storage device 300 through the second direct current output end. In this way, it is ensured that the superfluous part of the direct current in the photovoltaic device 200 is transferred to the energy storage device 300 via the alternating and direct current distribution cabinet 20 for storage for later use, thereby avoiding an energy waste and loss.

The alternating and direct current distribution cabinet 20 may further have the second alternating current output end 204. The second alternating current output end 204 of the alternating and direct current distribution cabinet 20 is connected to a transformer 400. The alternating current through the alternating and direct current distribution cabinet 20 is output to the transformer 400 through the second alternating current output end 204, and the transformer 400 may be configured to connect the alternating current to a grid, that is, the alternating current is used for power generation. In this way, it is ensured that after the direct current entering the alternating and direct current distribution cabinet 20 is converted into the alternating current, the alternating current is then output to the transformer 400 through the second alternating current output end 204, and the transformer 400 connects the alternating current to the grid for power generation, to implement power generation of a photovoltaic plant.

It should be noted that the alternating and direct current distribution cabinet 20 may be connected to one transformer 400, or may be connected to a plurality of transformers 400. This is not limited in this embodiment of this application. For example, in some embodiments, the second alternating current output end 204 of the alternating and direct current distribution cabinet 20 may be an alternating current side connected to two transformer windings, and the two transformer windings may be a same transformer or may be different transformers.

Specifically, in actual application, when an output power of the photovoltaic device 200 is less than an output power of the inverters 30 (that is, a sendout of the photovoltaic device 200 is less than a sendout of the inverters 30), the direct current in the energy storage device 300 is transferred to the inverters 30 via the alternating and direct current distribution cabinet 20, and the inverters 30 convert the direct current into an alternating current, and transfers the alternating current to the transformer 400 for power generation; or when an output power of the photovoltaic device 200 is greater than an output power of the inverters 30 (that is, a sendout of the photovoltaic device 200 is greater than a sendout of the inverters 30), a superfluous direct current in the photovoltaic device 200 is transferred, via the alternating and direct current distribution cabinet to the energy storage device 300 for charging. In this way, the direct current in the photovoltaic device 200 can be properly planned and effectively used to a maximum extent, thereby avoiding an energy loss.

In this embodiment of this application, as shown in FIG. 2, the inverters 30 may be placed sidewise in the frame 10 along a first direction L1 (that is, may be placed sidewise along a length direction of the frame 10, for example, in a manner of inserting a book). Compared with placing the inverters 30 in the frame 10 end to end or in another manner, the layout design of placing the inverters 30 in the frame 10 side by side along the first direction L1 can achieve maximum utilization, thereby maximizing a capacity of the frame 10.

Specifically, the plurality of inverters 30 may be arranged into an array of at least two rows, and there is a passage 31 between two adjacent rows of inverters 30. The first direct current input end 301 and the first alternating current output end are separately on two sides of each of the inverters 30. One of the first direct current input end 301 and the first alternating current output end faces towards the passage 31, and the other of the first direct current input end 301 and the first alternating current output end faces away from the passage 31.

For example, as shown in FIG. 2 or FIG. 3, in this embodiment of this application, the plurality of inverters 30 may include a first inverter group 32 and a second inverter group 33. The passage 31 is between the first inverter group 32 and the second inverter group 33. A first direct current input end 301 of an inverter 30 in the first inverter group 32 faces away from the passage 31, and a first alternating current output end of the inverter 30 in the first inverter group 32 faces towards the passage 31. A first direct current input end 301 of an inverter 30 in the second inverter group 33 faces towards the passage 31, and a first alternating current output end of the inverter 30 in the second inverter group 33 faces away from the passage 31.

In this way, wiring terminals (for example, the first direct current input end 301 and the first alternating current output end) of each inverter 30 face towards either an outer side of the frame 10 or the passage 31 of the frame 10, to facilitate maintenance of the wiring terminals and also avoid a problem in the conventional technology that, for example, a direct current line and an alternating current line crisscross in space.

In addition, in this embodiment of this application, a span of the passage 31 may be set based on a requirement of an actual application scenario. For better maintenance, the passage 31 may be set to a larger value. Considering a volume of the whole frame 10, the passage 31 may be set to a smaller value. The span of the passage 31 is not limited in this embodiment of this application.

There may be a preset distance between two adjacent inverters 30 in a plurality of inverters 30 in a same row, and the preset distance is less than one tenth of a thickness of the inverter 30. There is the preset distance between two adjacent inverters 30 in the plurality of inverters 30 in the same row, so that a problem of poor heat dissipation of the inverters 30 when the two adjacent inverters 30 are close to each other can be avoided, performance of temperature uniformity inside the frame 10 is better, and a problem of uneven temperature control is resolved. In addition, in this embodiment of this application, the preset distance is set to less than one tenth of the thickness of the inverter 30, so that not only heat dissipation performance of the inverters is ensured, but space utilization of the inverters 30 in the frame 10 can also satisfy a requirement.

In this embodiment of this application, an air intake and an air outlet may be further provided on the frame 10. There is an air passage between the air intake and the air outlet, and the air passage passes an outer side of the inverter 30 to dissipate heat in the inverter 30. For the inverter 30, air may come in from a side close to the bottom of the inverter 30, and air may come out from a side close to an upper part of the inverter 30. Alternatively, air may come in from a side that is of the inverter 30 and that is close to the passage 31, and air may come out from a side that is of the inverter 30 and that faces away from the passage 31, to reduce accumulation of hot air around the inverter 30. In addition, as the inverters 30 are densely arranged, the air intake and the air outlet have an effect similar to isolation, and there is no problem of backflow or mixed flows.

In addition, because the air outlet for each of the inverters 30 does not affect intake air of the inverter and another inverter, hot air received at the air intake of the inverter 30 can be reduced to a maximum extent, thereby avoiding a problem that an ambient temperature rises due to a temperature rise of the air intake of the inverter 30, reducing a distance between adjacent inverters 30 to a maximum extent, and increasing a density of the inverters 30 set up in the frame 10.

In an embodiment, the alternating and direct current distribution cabinet 20 and the transformer 400 may be interconnected by using a connection piece (not shown in the figure). Specifically, as shown in FIG. 3 and FIG. 4, the second alternating current output end 204 may be filled with copper bars 2041, and the copper bars 2041 may be covered by a sealing plate 2042. When the second alternating current output end 204 is connected to the transformer 400, one end of the connection piece is connected to the copper bars 2041 inside the second alternating current output end 204, and the other end of the connection piece is connected to the transformer 400.

In this way, when the transformer 400 needs to be connected to the alternating and direct current distribution cabinet 20, the sealing plate 2042 that covers the copper bars 2041 may be removed, so that the copper bars 2041 are exposed outside the second alternating current output end 204, and then the transformer 400 can be electrically connected to the alternating and direct current distribution cabinet 20 by using the connection piece. When the transformer 400 does not need to be connected to the alternating and direct current distribution cabinet 20, the sealing plate 2042 covers the copper bars 2041, to avoid an influence of the exposure of the copper bars 2041 and achieve a better look of the second alternating current output end 204 of the alternating and direct current distribution cabinet 20.

It should be noted that a copper bar is also referred to as a copper bus, a copper busbar or copper bus-bar, or a grounding copper bar, is a long conductor that is made of copper and that has a rectangular or chamfer (rounded corner) rectangular section (rounded-corner copper bar is generally used to avoid point discharge), and is used to transmit a current and connect to an electrical device in a circuit. The copper bar has advantages of low resistivity and large bendability. The copper bar is mainly used on a primary circuit (the copper bar is used for phase lines, zero lines, and ground wires with large currents). The copper bar is used to connect to a primary element or component with a relatively large current on an electric box. For example, a main busbar connects a box to another box in a row of electric boxes, and a branch busbar of the main busbar connects electrical switches (isolation switches, circuit breakers, or the like) of each electric box. The copper bar may be tin-plated or bare copper. A connection part of the copper bar on an electric box may be tin-plated, embossed, or added with a conductive paste. A spare part may be added with heat-shrink tubing for protection, and some are painted with dielectric oil.

In addition, when the copper bar is used, a current-carrying capacity of the copper bar needs to be considered. Specifically, a suitable copper bar needs to be selected based on a magnitude of a current. A screw at the connection part needs to be tightened, or the copper bar may be burnt out when the current is large.

In an embodiment, the connection piece may be a soft copper bar or a bellow. The soft copper bar is a copper bar made of soft materials. The bellow is a tubular elastic sensitive element formed by connecting foldable corrugated sheets along a folding direction, and is a cylindrical thin-wall corrugated housing with a plurality of transverse ridges and grooves. The bellow is elastic and can have a displacement under an effect of pressure, an axial force, a cross force or a bending moment. The bellow is generally made of bronze, brass, stainless steel, a monel metal or an inconel alloy, or the like, and is mainly used to convert pressure into a displacement or a force. The bellow has a relatively thin wall, a relatively high sensitivity, and a measurement range from tens of pascal to tens of megapascal. An open end of the bellow is fixed, and a sealing end is in a free state, and elasticity can be higher by using an auxiliary spiral spring or reed. When used, under an effect of internal pressure, the bellow extends along a length direction, so that the free end has a displacement that has a specific relationship with the pressure.

For example, the bellow may be any one or more of a metal bellow, a corrugated expansion joint, a corrugated heat exchange tube, and a diaphragm and diaphragm capsule. This is not limited in this embodiment of this application, and is not limited to the foregoing examples.

It can be understood that, in this embodiment of this application, a manner of disposing the alternating and direct current distribution cabinet 20 includes but is not limited to the following two possible implementations:

In an embodiment, a quantity of the alternating and direct current distribution cabinet 20 is one. The second direct current input end of the alternating and direct current distribution cabinet 20 is connected to the photovoltaic device 200, and the second direct current input end is configured to receive the corresponding direct current. The alternating and direct current distribution cabinet 20 has the plurality of first direct current output ends, and the plurality of first direct current output ends are connected to the first direct current input ends 301 of the plurality of inverters 30 in a one-to-one correspondence. In this way, a cooperative connection between one alternating and direct current distribution cabinet 20 and the plurality of inverters 30 and transfer of or conversion between a direct current and an alternating current can be implemented.

Direct currents of at least two inverters 30 are converged, so that a common direct current bus for more than two inverters 30 can be implemented, and alternating currents of the inverters 30 may share a bus and be output from one side.

In another embodiment, a quantity of the alternating and direct current distribution cabinet 20 is more than one. There is an alternating current interconnection between the plurality of alternating and direct current distribution cabinets 20. The second direct current input end of each of the plurality of alternating and direct current distribution cabinets 20 is connected to the photovoltaic device 200, and the second direct current input end is configured to receive the corresponding direct current. The first direct current output ends of the plurality of alternating and direct current distribution cabinets 20 are connected to the first direct current input ends 301 of the plurality of inverters 30 in a one-to-one correspondence. In this way, a cooperative connection between each of the alternating and direct current distribution cabinets 20 and the inverters 30 and transfer of or conversion between a direct current and an alternating current can be implemented.

In still another embodiment, a quantity of the alternating and direct current distribution cabinet 20 is more than one. There is an alternating current interconnection between the plurality of alternating and direct current distribution cabinets 20. The second direct current input end of each of the plurality of alternating and direct current distribution cabinets 20 is connected to the photovoltaic device 200, and the second direct current input end is configured to receive the corresponding direct current. The first direct current output end of each alternating and direct current distribution cabinet 20 in the plurality of alternating and direct current distribution cabinets is connected to first direct current input ends 301 of at least two inverters 30 in a one-to-one correspondence. In this way, a flexible combination and pairing between the plurality of alternating and direct current distribution cabinets 20 and the plurality of inverters 30 and transfer of or conversion between a direct current and an alternating current can be implemented at the same time.

Based on the foregoing embodiment, switches or fuses may be provided between the first direct current output ends of the alternating and direct current distribution cabinet 20 and the first direct current input ends 301 of the inverters 30, and a switch or fuse may be provided between the alternating current input end of the alternating and direct current distribution cabinet 20 and the first alternating current output ends of the inverters 30. In this way, control of enabling or disabling direct current or alternating current transfer between the alternating and direct current distribution cabinet and the inverters can be facilitated. Switch control can simplify an on-site construction and maintenance scenario. In addition, the fuses can protect the inverters 30 and prevent faults such as a short circuit in the inverters 30.

In addition, it should be noted that, compared with separate disposition of an alternating current distribution cabinet and a direct current distribution cabinet in a conventional technology with a need to separately provide a switch used to control the alternating current distribution cabinet or a switch used to control the direct current distribution cabinet, a need to find a corresponding switch when an individual inverter 30 is maintained, and thus a difficulty in maintaining, a coupling manner of the alternating and direct current distribution cabinet 20 in this embodiment of this application allows a smaller quantity of switches corresponding to the inverters so that an on-site construction and maintenance scenario can be simplified.

In an embodiment, when the switch is provided between the alternating current input end of the alternating and direct current distribution cabinet 20 and the first alternating current output ends of the inverters 30, each switch may be connected to the first alternating current output end of the inverter 30 in a one-to-one correspondence, or each switch may be connected to first alternating current output ends of at least two inverters 30 in a one-to-one correspondence. In other words, one switch may correspond to and control one inverter 30, or one switch may correspond to and control a plurality of inverters 30.

Similarly, a switch or fuse may further be provided between the second direct current input end of the alternating and direct current distribution cabinet 20 and the photovoltaic device 200, between the second alternating current output end 204 of the alternating and direct current distribution cabinet 20 and the transformer 400, and between the second direct current output end of the alternating and direct current distribution cabinet 20 and the energy storage device 300. In this way, control of enabling or disabling direct current transfer between the alternating and direct current distribution cabinet and the inverters can be facilitated. Switch control can simplify an on-site construction and maintenance scenario. In addition, the fuse can protect a circuit and prevent faults such as a short circuit.

In an embodiment, the switch may be any one of a circuit breaker, a strip-type fuse switch, a load switch, or a contactor.

Figure 5:
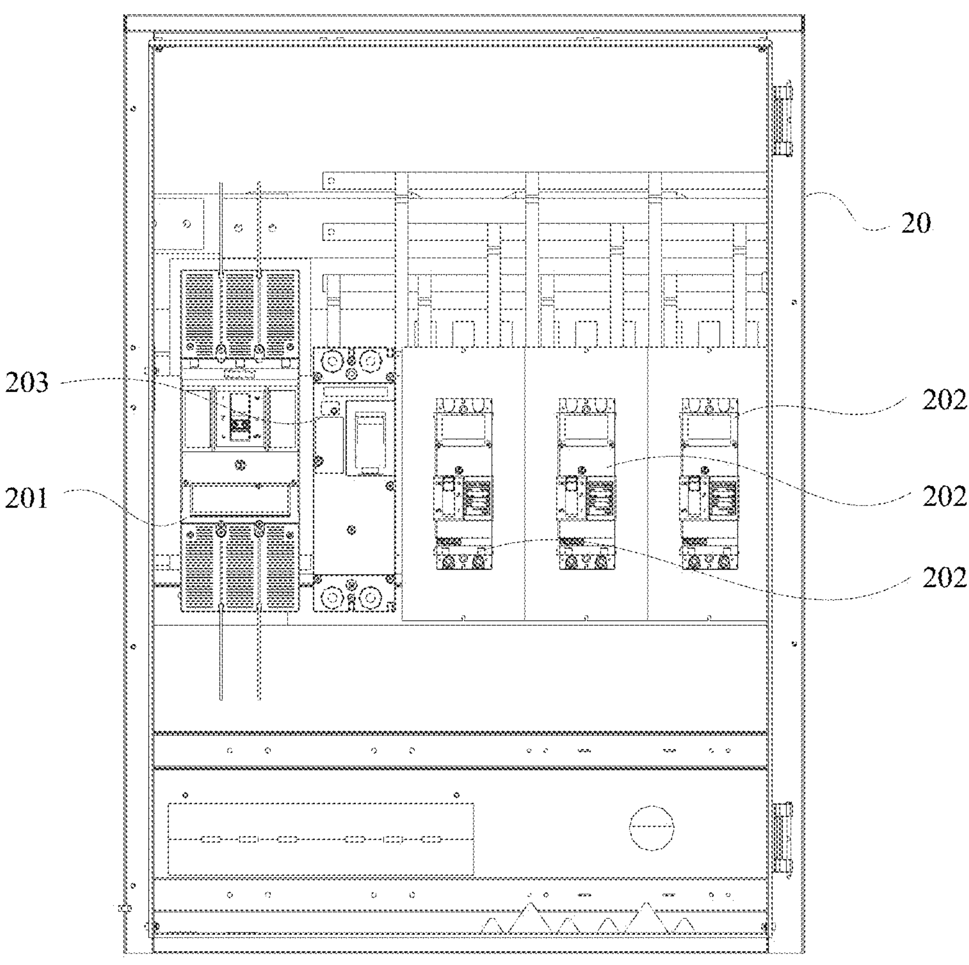
FIG. 5 is a schematic diagram of a structure of an alternating and direct current distribution cabinet in an inverter apparatus according to an embodiment of this application.

For example, as shown in FIG. 5, the alternating and direct current distribution cabinet has an alternating current switch 201, direct current switches 202, and an energy storage switch 203. The alternating current switch 201 is connected to the alternating current input end of the alternating and direct current distribution cabinet 20 and the second alternating current output end 204 of the alternating and direct current distribution cabinet 20. The alternating current switch 201 is configured to control enabling or disabling of alternating current transfer between the alternating current input end of the alternating and direct current distribution cabinet 20 and the first alternating current output ends of the inverters 30, and between the second alternating current output end 204 of the alternating and direct current distribution cabinet 20 and the transformer 400. The direct current switches 202 are connected to the first direct current output ends of the alternating and direct current distribution cabinet 20 and the second direct current input end of the alternating and direct current distribution cabinet 20. The direct current switches 202 are configured to control enabling or disabling of direct current transfer between the first direct current output ends of the alternating and direct current distribution cabinet 20 and the first direct current input ends 301 of the inverters 30, and between the second direct current input end of the alternating and direct current distribution cabinet 20 and the photovoltaic device 200. The energy storage switch 203 is connected to the second direct current output end of the alternating and direct current distribution cabinet 20, and the energy storage switch 203 is configured to control enabling or disabling of direct current transfer between the second direct current output end of the alternating and direct current distribution cabinet 20 and the energy storage device 300.

As shown in FIG. 1 or FIG. 2, in this embodiment of this application, the frame 10 may include at least a platform 101. The alternating and direct current distribution cabinet 20 may be on the platform 101, and the inverters 30 may be disposed above the alternating and direct current distribution cabinet 20.

In some embodiments, the frame 10 may further include a lateral framework 102. The lateral framework 102 is fixedly connected to the platform 101, and the lateral framework 102 surrounds and keeps at least a part of the alternating and direct current distribution cabinet 20 and a part of the inverters 30 on an inner side of the frame 10. In this way, the lateral framework 102 can protect four sides of the alternating and direct current distribution cabinet 20 and the inverters and prevent the periphery of the alternating and direct current distribution cabinet 20 and the inverters 30 from being worn down or damaged.

Further, the frame 10 may further include a top framework 103. One end of the lateral framework 102 is fixedly connected to the top framework 103, and the other end of the lateral framework 102 is fixedly connected to the platform 101. The top framework 103 is arranged opposite to the platform 101, and the top framework 103 is disposed above the inverters 30. By disposing the top framework 103, the top framework 103 can cover the alternating and direct current distribution cabinet 20 and the inverters 30 on the platform 101, for example, can keep out sunlight and rain, thereby preventing corrosion or aging caused by long-time exposure of the exterior of the devices on the platform 101.

In an embodiment, a projection area of the top framework 103 in a vertical direction is greater than a projection area of the platform 101 in the vertical direction. In this way, the top framework 103 can better cover the devices on the platform 101, avoiding or reducing a problem of incomplete coverage. For example, in an actual application scenario, the top framework 103 may be extended on two sides or four sides in different placement scenarios.

It is easy to understand that, when the frame 10 includes only the platform 101, that is, when the surrounding framework (the lateral framework 102) is removed, or the top (the top framework 103) is removed, investment costs can be reduced to some extent. Clearly, in some embodiments, the platform 101 may alternatively be divided into two independent platforms on two sides of the passage 31, and the frame 10 may include the plurality of independent platforms.

In this embodiment of this application, as shown in FIG. 3, the inverter apparatus 100 may further include an inverter support 40 configured to hold the inverters 30. The inverter support is fixedly connected to the frame 10, or the inverter support 40 is fixed to the alternating and direct current distribution cabinet 20. By disposing the inverter support 40, the inverter support 40 is fixed to the frame 10 or the alternating and direct current distribution cabinet 20, so that the inverters 30 can be placed more stably, and fixed positions of the inverters 30 can be limited.

It should be noted that the inverter support 40 may be an integral support, or may be a support that needs to be put together. This is not limited in this embodiment of this application.

Still refer to FIG. 4. In some embodiments, a plurality of guide rails 50 are further provided above the alternating and direct current distribution cabinet 20, and the inverter support is in a sliding connection to the guide rails 50. In this way, the inverters 30 can be mounted and removed in a pulling manner more conveniently.

Specifically, sliders (not shown in the figure) may be disposed on the inverter support and the inverter support 40 is connected to the guide rails 50 by using the sliders. In addition, to limit a movement range of the sliders in a specific manner, limiting pieces (not shown in the figure) are further disposed on one side of the inverter support 40, and when the sliders slide relative to the guide rails 50, the limiting pieces are used to limit the movement range of the sliders on the guide rails 50.

In this embodiment of this application, the guide rails 50 may be in parallel with a second direction L2; and the second direction L2 is perpendicular to the first direction L1. The guide rails 50 are in parallel with the second direction L2 that is perpendicular to the first direction L1, so that the inverters 30 can implement sideways pulling, for example, book pulling. This helps maximize utilization of space in the frame 10.

In addition, a shock absorption structure 60 is disposed on the inverter support 40. The shock absorption structure 60 is between the inverters 30 and the alternating and direct current distribution cabinet 20; or the shock absorption structure 60 is between the inverters 30 and the inverter support 40. By disposing the shock absorption structure, a risk of vibration when the inverters 30 are mounted and transported can be removed or reduced, and the inverter 30 is protected and satisfies a pre-assembly transportation requirement, thereby improving a service life of the inverter 30 to some extent.

In an embodiment, the shock absorption structure 60 is a rubber pad. The rubber pad is elastic, and can provide a specific buffer effect between the inverter 30 and the inverter support 40 or between the inverter 30 and the alternating and direct current distribution cabinet 20, to avoid a large vibration of the inverter 30 and affecting the service life of the inverter 30.

In this embodiment of this application, as shown in FIG. 4, the inverter apparatus 100 may further include signal wires 80. One end of each of the signal wires 80 is connected to the inverter 30, and the other end of the signal wire 80 is connected to a control unit (not shown in the figure). The control unit is configured to a logic relationship between the inverter and another device. For example, the control unit may be configured to: control a communication signal of the inverter 30, and detect a position of fault in the inverter 30. The signal wire 80 is located above the inverter 30. In this way, the direct current cables 701 and the alternating current cables 702 can be avoided, thereby avoiding problems of a staggered serial connection and even crosstalk between the signal wires 80 and the direct current cables 701 and the alternating current cables 702 can be avoided.

Figures 6, 7:
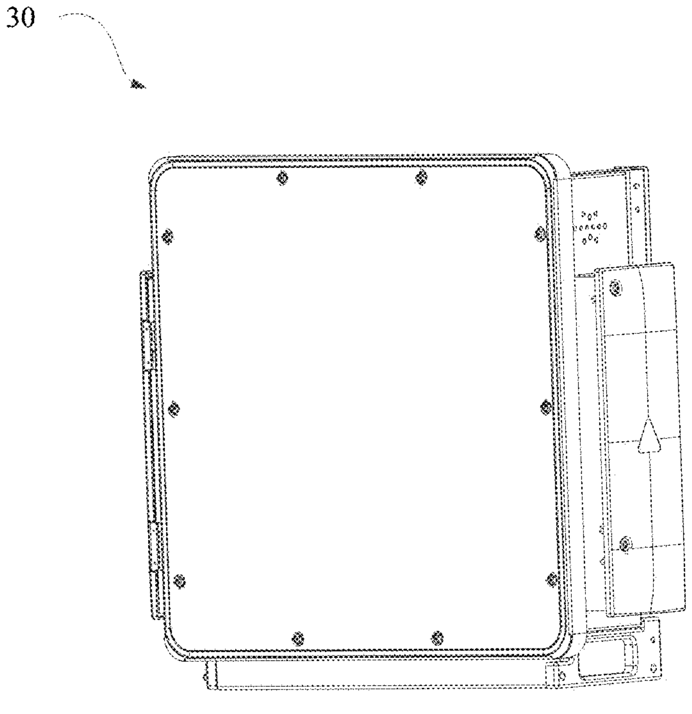
FIG. 6 is a schematic diagram of a structure of an inverter in an inverter apparatus according to an embodiment of this application.
FIG. 7 is a schematic diagram of a structure of an inverter system according to an embodiment of this application.

FIG. 6 is a schematic diagram of a structure of the inverter 30 in the inverter apparatus 100 according to an embodiment of this application. In this embodiment of this application, an ingress protection rating of the inverters 30 is greater than or equal to IP54. For example, the ingress protection rating of the inverters 30 may be IP55, IP56, IP57, or the like. This is not limited in this embodiment of this application, and is not limited to the foregoing examples. A higher ingress protection rating indicates better dustproof and moisture-proof performance. In this embodiment of this application, the ingress protection rating of the inverters 30 is set to greater than or equal to IP54 to ensure dustproof and moisture-proof performance of the inverters 30.

It can be understood that, the Ingress Protection (IP) system refers to rating of an electric appliance based on a dustproof and moisture-proof feature of the electric appliance. The IP ingress protection rating includes two digits. The first digit indicates an ingress protection rating of the electric appliance against dust and an invading foreign object (herein, the foreign object includes a tool, and a human finger or the like cannot touch a live part of the electric appliance to prevent electric shocks). The second digit indicates a sealing degree of the electric appliance against moisture and penetration of water. Larger values of the digits indicate a higher ingress protection rating.

In this embodiment of this application, the inverters 30 may be unidirectional inverters or bidirectional inverters 30. Specifically, a type may be flexibly selected based on a requirement in an actual application scenario.

In this embodiment of this application, the photovoltaic device 200 may be a direct current combiner box with a maximum power point tracking function. It should be noted that, a maximum power point tracking (MPPT) system refers to an electrical system that enables a photovoltaic panel to output more currents by adjusting an operating status of an electrical module, so that direct current power from a solar panel can be effectively stored in a battery.

For example, an MPPT controller can monitor a power generation voltage of the solar panel in real time and track a maximum voltage and current (VI), so that the system charges the battery with a maximum output power. The maximum power point tracking system is used in a solar photovoltaic system to coordinate operation of a solar panel, a battery, and a load. During actual operation, an output voltage of the solar panel needs to be higher than a current voltage of the battery when the battery is charged. If the voltage of the solar panel is lower than the voltage of the battery, an output current is close to 0.

Clearly, in some other embodiments, the photovoltaic device 200 may alternatively be a direct current combiner box without the MPPT function. This is not limited in this embodiment of this application.

In addition, the energy storage device 300 may include at least one direct current converter, and the direct current converter may be configured to regulate an energy storage voltage of the energy storage device 300. It should be noted that the direct current converter may be a parallel direct current converter, or may be a non-parallel direct current converter. This is not limited in this embodiment of this application.

In actual application, the alternating and direct current distribution cabinet 20 may be connected to a plurality of inverters 30 and a plurality of energy storage devices 300. A specific configuration may be calculated based on a requirement on an energy storage access proportion of a photovoltaic plant, a rated power of the inverters 30, and a rated power of the energy storage devices 300. For example, in some scenarios, four inverters and one energy storage device 300 may be selected for one alternating and direct current distribution cabinet 20.

Embodiment 2

An embodiment of this application provides an inverter system 1. As shown in FIG. 7, the inverter system 1 may include at least the inverter apparatus 100 in Embodiment 1.

According to the inverter system 1 provided in this embodiment of this application, the inverter system 1 includes at least an inverter apparatus 100. The inverter apparatus 100 includes at least one frame 10, and a plurality of inverters 30 and an alternating and direct current distribution cabinet 20 that are in each frame 10. The alternating and direct current distribution cabinet 20 has a direct current output end and an alternating current input end, and the inverters 30 each have a first direct current input end 301 and a first alternating current output end. The direct current output end of the alternating and direct current distribution cabinet 20 is connected to first direct current input ends 301 of the inverters 30, first alternating current output ends of the inverters 30 are connected to the alternating current input end of the alternating and direct current distribution cabinet 20, and the alternating and direct current distribution cabinet 20 outputs a converged alternating current.

A direct current through the alternating and direct current distribution cabinet 20 passes through the direct current output end and the first direct current input ends 301 and is then transferred to the inverters 30. The inverters 30 convert the direct current into an alternating current. The alternating current goes back to the alternating and direct current distribution cabinet 20 through the first alternating current output ends and the alternating current input end. The alternating and direct current distribution cabinet 20 then converges and outputs the alternating current. Compared with a manner of disposing a direct current distribution cabinet and an alternating current distribution cabinet separately in a conventional technology, this embodiment of this application can simplify on-site wiring by using the coupled alternating and direct current distribution cabinet 20, so that on-site maintenance is reduced to some extent.

In this embodiment of this application, the inverter system 1 may further include a photovoltaic device 200. The alternating and direct current distribution cabinet 20 in the inverter apparatus 100 is connected to the photovoltaic device 200, and a second direct current input end of the alternating and direct current distribution cabinet 20 is configured to receive a direct current from the photovoltaic device 200. The second direct current input end of the alternating and direct current distribution cabinet 20 is connected to the photovoltaic device 200, so that it is ensured that the photovoltaic device 200 inputs a direct current into the alternating and direct current distribution cabinet 20, thereby ensuring that the direct current is transferred to the inverters 30 via the alternating and direct current distribution cabinet 20 and then converted into an alternating current.

In addition, with rapid development of photovoltaic power generation technologies, an installed capacity has been increased rapidly. However, photovoltaic power generation has disadvantages such as intermittence and low controllability. Before being processed, if power is directly connected to a grid on a large scale, the grid is greatly impacted, affecting stable operation of the grid.

To ensure that generated photovoltaic power is smoothly and stably output to the grid and that stability of the grid is not affected even when the power is connected to the grid on a large scale, the inverter system 1 in this embodiment of this application may further include an energy storage device 300. A second direct current output end of the alternating and direct current distribution cabinet 20 is connected to the energy storage device 300, and the energy storage device 300 is configured to store a part of the direct current from the photovoltaic device 200. The first direct current output ends of the alternating and direct current distribution cabinet 20 are connected to the first direct current input ends 301 of the inverters 30, and the second direct current output end of the alternating and direct current distribution cabinet 20 is connected to the energy storage device 300, so that it is ensured that the part of the direct current of the photovoltaic device 200 is transferred to the energy storage device 300 via the alternating and direct current distribution cabinet 20 for storage for later use.

In addition, in a conventional technology, for a modular/string inverter 30, energy storage access in a photovoltaic plant is usually a connection to the energy storage device 300 on site through a reserved direct current port of the inverter 30, and the energy storage device 300 and the string inverter 30 are usually configured in a one-to-one correspondence. Compared with the conventional technology, in this application, the second direct current output end of the alternating and direct current distribution cabinet 20 is connected to the energy storage device 300, so that there is an effect of convergence and pre-integration by using a bus, thereby resolving a problem of direct current coupled access of the inverters 30 and the energy storage device 300, to match an optical storage direct current coupling scenario. In addition, there is no need to reserve a direct current port on the inverter 30, and there is no need to configure and use the energy storage device 300 and the inverter 30 in a one-to-one correspondence, thereby simplifying an apparatus to some extent and reducing costs.

In addition, as a requirement on an installed capacity of the energy storage device 300 varies greatly in different countries, regions, and projects, conventional configuration requirements on such as an energy storage power and a photovoltaic power may range from 5% to 100%. Therefore, a quantity and a size of the alternating and direct current distribution cabinet 20 may vary, or a quantity of switches inside the alternating and direct current distribution cabinet 20 may be extended, to facilitate access of energy storage devices 300 satisfying different configuration requirements. In addition, because there is the alternating and direct current distribution cabinet a direct current coupling energy storage solution may be flexibly and conveniently configured for the inverters 30 based on different project requirements.

In this embodiment of this application, the inverter system 1 may further include a transformer 400. A second alternating current output end 204 of the alternating and direct current distribution cabinet 20 is connected to the transformer 400, an alternating current is output to the transformer 400 through the second alternating current output end 204, and the transformer 400 is configured to connect the alternating current to a grid. The second alternating current output end 204 of the alternating and direct current distribution cabinet 20 is connected to the transformer 400, so that it is ensured that after a direct current entering the alternating and direct current distribution cabinet 20 is converted into the alternating current, the alternating current is output to the transformer 400 through the second alternating current output end 204, and the transformer 400 connects the alternating current to the grid for power generation.

It should be noted that the transformer 400 is an apparatus that transforms an alternating voltage based on a principle of electromagnetic induction, and mainly includes a primary coil, a secondary coil, and an iron core (or a magnetic core). Main functions of the transformer 400 include voltage conversion, current conversion, impedance conversion, isolation, voltage stabilization (magnetic saturation transformer), and the like. The transformer 400 may be classified by usage purposes into a power transformer and a special transformer (an electric furnace transformer, a rectifier transformer, a power frequency testing transformer, a voltage regulator, a mining transformer, an audio transformer, an intermediate frequency transformer, a high frequency transformer, an impulse transformer, an instrument transformer, an electronic transformer, a reactor, a mutual inductor, or the like). It can be understood that a specific type of the transformer is not limited in this embodiment of this application, and is not limited to the foregoing examples.

In descriptions of embodiments of this application, it should be noted that, unless otherwise clearly specified and limited, the terms "mounting", "connection to", and "connection" should be understood in a broad sense. For example, the connection may be a fixed connection, may be an indirect connection by using an intermediate medium, or may be an interconnection between two elements or an interaction relationship between two elements. For a person of ordinary skill in the art, specific meanings of the foregoing terms in embodiments of this application can be understood based on specific cases.

An apparatus or element in embodiments of this application or an implied apparatus or element needs to have a specific orientation and be configured and operated based on the specific orientation, and therefore cannot be construed as a limitation to embodiments of this application. In the descriptions of embodiments of this application, "a plurality of" means two or more, unless otherwise precisely and specifically specified.

The terms "first", "second", "third", "fourth", and the like (if used) in the description, the claims, and the accompanying drawings of embodiments of this application are used to distinguish between similar objects, and are not necessarily intended to describe a specific order or sequence. It should be understood that data termed in such a way is interchangeable in proper circumstances, so that embodiments of this application described herein can be implemented, for example, in an order other than the order illustrated or described herein. In addition, terms such as "include", "have", and any variations thereof are intended to cover non-exclusive inclusions, for example, a process, method, system, product, or device that includes a series of steps or units, which are not necessarily limited to those clearly listed steps or units, but may include other steps or units that are not clearly listed or inherent to such a process, method, product, or device.

Finally, it should be noted that the foregoing embodiments are merely intended for describing the technical solutions of embodiments of this application, but not for limiting embodiments of this application. Although embodiments of this application are described in detail with reference to the foregoing embodiments, a person of ordinary skill in the art should understand that modifications can still be made to the technical solutions described in the foregoing embodiments or equivalent replacements can still be made to all or some of technical features thereof, and essence of a corresponding technical solution does not depart from the scope of the technical solutions of embodiments of this application.

What is claimed is:

1. An inverter apparatus, comprising:

at least one frame;

a plurality of inverters and an alternating and direct current distribution cabinet that are in a frame of the at least one frame, wherein the alternating and direct current distribution cabinet includes a direct current output end and an alternating current input end, and each of the inverters includes a first direct current input end and a first alternating current output end; and the direct current output end of the alternating and direct current distribution cabinet is connected to first direct current input ends of the inverters using direct current cables, first alternating current output ends of the inverters are connected to the alternating current input end of the alternating and direct current distribution cabinet using alternating current cables, and a second alternating current output end of the alternating and direct current distribution cabinet outputs a converged alternating current.

2. The inverter apparatus according to claim 1, wherein the alternating and direct current distribution cabinet further has a second direct current input end, the second direct current input end of the alternating and direct current distribution cabinet is connected to a photovoltaic device, and the second direct current input end is configured to receive a direct current from the photovoltaic device.

3. The inverter apparatus according to claim 2, wherein the direct current output end of the alternating and direct current distribution cabinet comprises first direct current output ends and a second direct current output end; and the first direct current output ends are connected to the first direct current input ends of the inverters, the second direct current output end is connected to an energy storage device, and the energy storage device is configured to store a part of the direct current from the photovoltaic device.

4. The inverter apparatus according to claim 3, wherein the second alternating current output end of the alternating and direct current distribution cabinet is connected to a transformer; and the alternating current is output to the transformer through the second alternating current output end, and the transformer is configured to connect the alternating current to a grid.

5. The inverter apparatus according to claim 3, wherein when an output power of the photovoltaic device is greater than an output power of the inverters, a superfluous direct current in the photovoltaic device is transferred, via the alternating and direct current distribution cabinet, to the energy storage device for charging; or when an output power of the photovoltaic device is less than an output power of the inverters, the direct current in the energy storage device is transferred to the inverters via the alternating and direct current distribution cabinet, and the inverters convert the direct current into an alternating current.

6. The inverter apparatus according to claim 1, wherein the inverters are placed in the frame side by side along a first direction.

7. The inverter apparatus according to claim 6, wherein the plurality of inverters are arranged into an array of at least two rows, and there is a passage between two adjacent rows of inverters; and the first direct current input end and the first alternating current output end are separately on two sides of each of the inverters, wherein one of the first direct current input end and the first alternating current output end faces towards the passage, and the other of the first direct current input end and the first alternating current output end faces away from the passage.

8. The inverter apparatus according to claim 7, wherein there is a preset distance between two adjacent inverters in a plurality of inverters in a same row; and the preset distance is less than one tenth of a thickness of an inverter.

9. The inverter apparatus according to claim 7, wherein the plurality of inverters comprise a first inverter group and a second inverter group;

the passage is between the first inverter group and the second inverter group;

a first direct current input end of an inverter in the first inverter group faces away from the passage, and a first alternating current output end of the inverter in the first inverter group faces towards the passage; and a first direct current input end of an inverter in the second inverter group faces towards the passage, and a first alternating current output end of the inverter in the second inverter group faces away from the passage.

10. The inverter apparatus according to claim 4, wherein the second alternating current output end is filled with a copper bar, and the copper bar is covered by a sealing plate; and the inverter apparatus further comprises a connection piece, wherein when the second alternating current output end is connected to the transformer, one end of the connection piece is connected to the copper bar inside the second alternating current output end, and an other end of the connection piece is connected to the transformer.

11. The inverter apparatus according to claim 4, wherein a quantity of the alternating and direct current distribution cabinet is one, the second direct current input end of the alternating and direct current distribution cabinet is connected to the photovoltaic device, and the second direct current input end is configured to receive the corresponding direct current; and The alternating and direct current distribution cabinet has the plurality of first direct current output ends, and the plurality of first direct current output ends are connected to the first direct current input ends of the plurality of inverters in a one-to-one correspondence.

12. The inverter apparatus according to claim 4, wherein a quantity of the alternating and direct current distribution cabinet is more than one, and there is an alternating current interconnection between the plurality of alternating and direct current distribution cabinets;

the second direct current input end of each of the plurality of alternating and direct current distribution cabinets is connected to the photovoltaic device, and the second direct current input end is configured to receive the corresponding direct current; and the first direct current output ends of the plurality of alternating and direct current distribution cabinets are connected to the first direct current input ends of the plurality of inverters in a one-to-one correspondence.

13. The inverter apparatus according to claim 4, wherein switches or fuses are provided between the first direct current output ends of the alternating and direct current distribution cabinet and the first direct current input ends of the inverters; or the switches or fuses are provided between the alternating current input end of the alternating and direct current distribution cabinet and the first alternating current output ends of the inverters.

14. The inverter apparatus according to claim 13, wherein each of the switches is connected to the first alternating current output end of each of the inverters in a one-to-one correspondence, or each of the switches is correspondingly connected to first alternating current output ends of at least two of the inverters.

15. The inverter apparatus according to claim 4, wherein a switch or a fuse is provided between the second direct current input end of the alternating and direct current distribution cabinet and the photovoltaic device;

a switch or a fuse is provided between the second alternating current output end of the alternating and direct current distribution cabinet and the transformer; and a switch or a fuse is provided between the second direct current output end of the alternating and direct current distribution cabinet and the energy storage device.

16. The inverter apparatus according to claim 1, wherein the frame at least comprises a platform, the alternating and direct current distribution cabinet is on the platform, and the inverters are disposed above the alternating and direct current distribution cabinet; and the frame further comprises a lateral framework, and the lateral framework is fixedly connected to the platform; and the lateral framework surrounds and keeps at least a part of the alternating and direct current distribution cabinet and a part of the inverters on an inner side of the frame; and the frame further comprises a top framework, one end of the lateral framework is fixedly connected to the top framework, and an other end of the lateral framework is fixedly connected to the platform; and the top framework is arranged opposite to the platform, and the top framework is disposed above the inverters to cover the inverters; and a projection area of the top framework in a vertical direction is greater than a projection area of the platform in the vertical direction.

17. The inverter apparatus according to claim 6, further comprising an inverter support, wherein the inverter support is configured to hold the inverters; and the inverter support is fixedly connected to the frame, or the inverter support is fixed to the alternating and direct current distribution cabinet.

18. The inverter apparatus according to claim 17, wherein a plurality of guide rails are further provided above the alternating and direct current distribution cabinet, and the inverter support is in a sliding connection to the guide rails;

the guide rails are in parallel with a second direction; and the second direction is perpendicular to the first direction.

19. The inverter apparatus according to claim 17, wherein a shock absorption structure is disposed on the inverter support, and the shock absorption structure is between the inverters and the alternating and direct current distribution cabinet; or the shock absorption structure is between the inverters and the inverter support.

20. An inverter system, comprising:

an inverter apparatus, the inverter apparatus comprises:

at least one frame;

a plurality of inverters and an alternating and direct current distribution cabinet that are in a frame of the at least one frame, wherein the alternating and direct current distribution cabinet includes a direct current output end and an alternating current input end, and each of the inverters includes a first direct current input end and a first alternating current output end; and the direct current output end of the alternating and direct current distribution cabinet is connected to first direct current input ends of the inverters using direct current cables, first alternating current output ends of the inverters are connected to the alternating current input end of the alternating and direct current distribution cabinet using alternating current cables, and a second alternating current output end of the alternating and direct current distribution cabinet outputs a converged alternating current.

* * * * *